Figure 1:
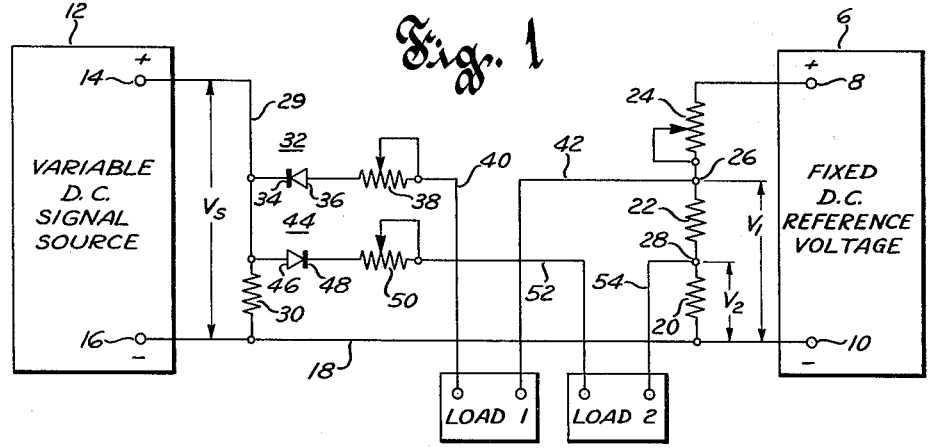

July 27, 1965  F. S. HORNER, JR  3,197,688
MOTOR CONTROL SYSTEM WITH CROSS-OVER CIRCUIT
Filed July 11, 1962  2 Sheets-Sheet 1

Inventor
Fred S. Horner, Jr.
By H. R. Rather
Attorney

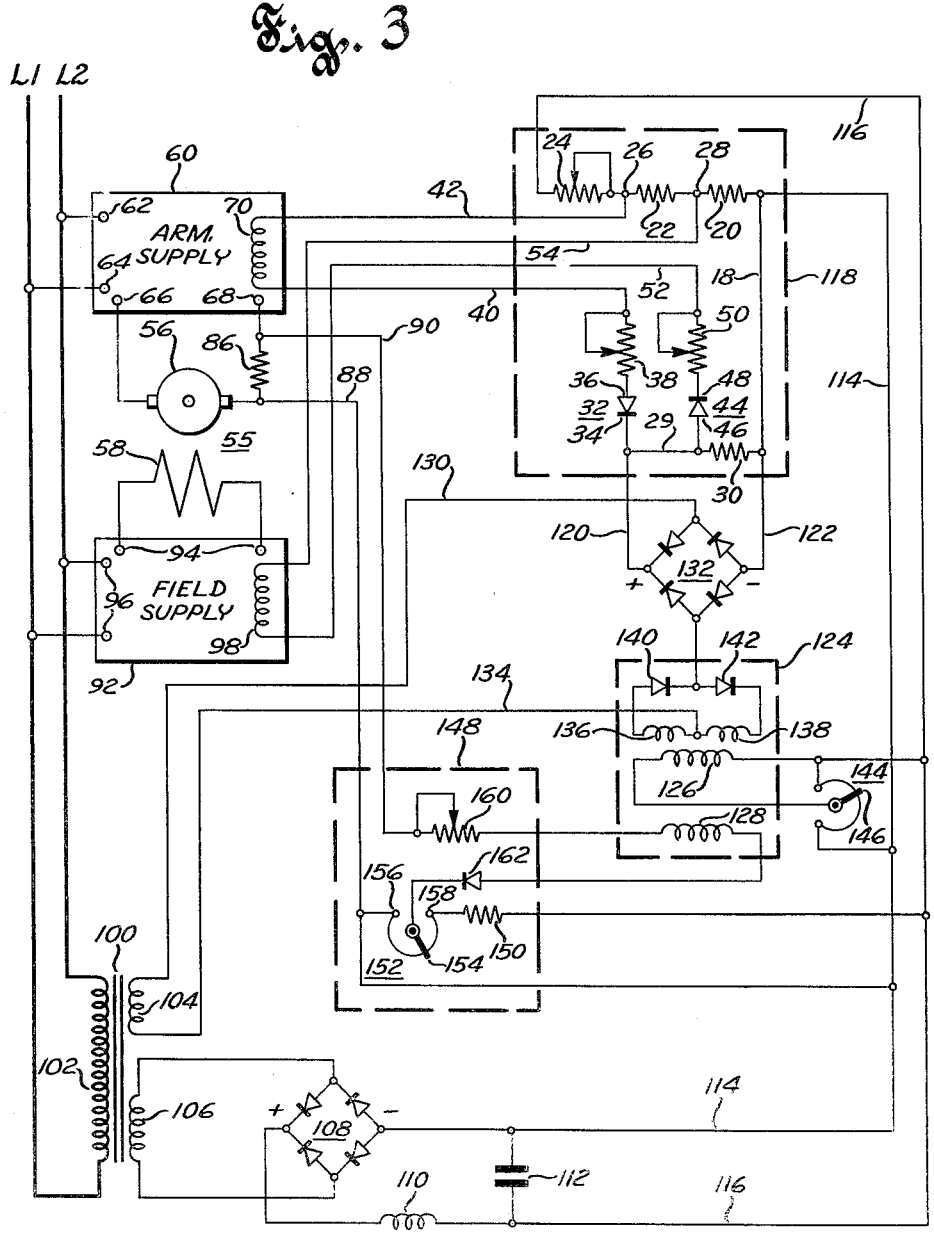

United States Patent Office 3,197,688
Patented July 27, 1965

3,197,688
MOTOR CONTROL SYSTEM WITH CROSS-OVER CIRCUIT
Fred S. Horner, Jr., Waukesha, Wis., assignor to Cutler-Hammer, Inc., Milwaukee, Wis., a corporation of Delaware
Filed July 11, 1962, Ser. No. 208,987
6 Claims. (Cl. 318—338)

This invention relates to electrical control systems which provide automatic control of two variable quantities in a preselected relationship. More particularly this invention relates to direct current electrical motor controllers which regulate motor speed by varying both armature voltage and field strength.

It is well known that the speed of a direct current motor may be controlled by variation of either or both the applied armature voltage and the field energizing voltage. Commonly, the motor is run at low speeds with full rated field voltage and low armature voltage. The speed is then increased by increasing the applied armature voltage until the full rated armature voltage is reached. The speed at which full armature voltage is reached is known as the base speed. The speed may be further increased by reducing the field energizing voltage. The latter method of speed control is known as field weakening and the transition from armature voltage control to field weakening is known as cross-over. In automatic control of motors, it is desirable to accomplish this cross-over function smoothly and in response to a single signal voltage.

It is also common in the art of motor control to employ devices which sense the magnitude of current carried by the armature and limit this current to safe values. This action is known as current limit control. When a direct current motor is operated in the weak field range, maximum torque cannot be obtained since the torque available is proportional to the field strength. When the load is increased, the motor tends to slow down and the armature current may increase to a point where current limit control must be applied. Under these circumstances it would be desirable to increase the field strength to its rated value in order to obtain maximum torque before reducing the applied armature voltage. In this way, if the motor can supply sufficient torque at base speed to overcome the increased load, the armature voltage will not have to be reduced. If the increase in torque is insufficient and the armature current continues to be excessive, it would then, of course, be desirable to lower the armature voltage as required.

It is, therefore, an object of this invention to provide a simple, reliable, and adaptable electrical cross-over circuit which will control two dependently variable electrical quantities in a preselected relationship in response to changes in an independently variable signal.

A more specific object of this invention is to provide an improved electrical motor control system which, when current limit control is applied to a motor operating in the weak field range, will increase the field strength approximately to its rated value to obtain maximum torque before reducing the applied armature voltage.

Another object of this invention is to provide control systems of the previously described type with simple and convenient control means to adjust the operating characteristics of the system and regulated motor.

A more complete understanding of the invention will be had and other objects will appear upon referring to the following description and claims.

While the device hereinafter described is adapted to fulfill the objects stated it is to be understood that it is not intended that the invention be confined to the particular preferred embodiment disclosed, since it is susceptible of various modifications without departing from the scope of the appended claims.

Figure 2:
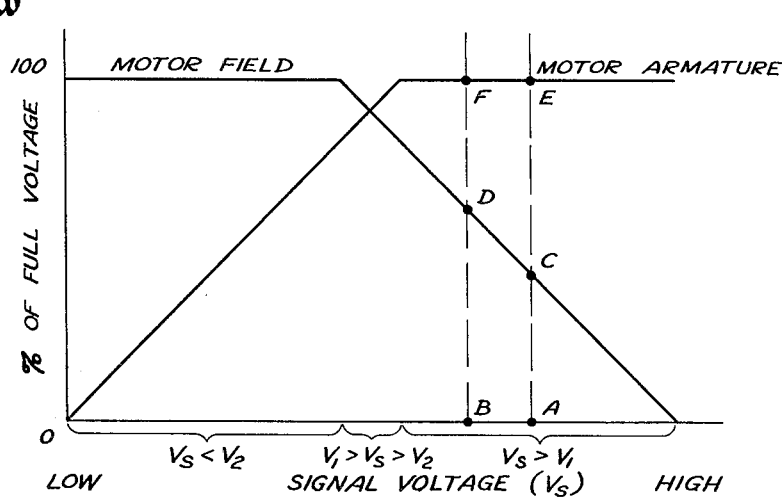
Figure 4:
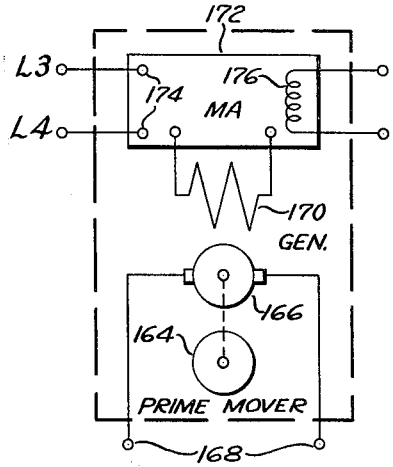

In the accompanying drawings:
FIGURE 1 is a schematic drawing of the basic cross-over circuit;
FIG. 2 is a graphic illustration of certain operating characteristics of the control system;
FIG. 3 is a schematic drawing of an electrical motor speed regulating system which embodies the features of this invention; and
FIG. 4 is a schematic diagram of a controllable armature supply of a type which could be utilized in the system illustrated in FIG. 3.

The basic cross-over circuit is best illustrated in FIG. 1. It is essentially a voltage comparison circuit which controls two loads in a preselected relationship. A fixed D.C. reference voltage source 6 is furnished with a positive terminal 8 and a negative terminal 10. A variable D.C. signal source 12 is similarly furnished with a positive terminal 14 and a negative terminal 16. A conductor 18 connects terminal 10 to terminal 16 and thereby establishes a common potential at the negative terminals 10 and 16 of voltage sources 6 and 12. Across the terminals 8 and 10 of the reference voltage source 6, there is a voltage dividing system of resistances shown here as fixed resistors 20 and 22 and variable resistor 24. This voltage divider system furnishes voltage $V_1$ at connection point 26 and voltage $V_2$ at point 28, both of which points are positive in respect to conductor 18 with $V_2$, of course, being of lesser magnitude than $V_1$. The magnitudes of $V_1$ and $V_2$ may be controlled by adjustment of variable resistor 24. The variable signal $V_s$ from the signal voltage source 12 is impressed through conductor 29 across resistor 30. Between positive conductor 29 and the opposing voltage divider system, there are two branches, each comprising a unidirectional diode, a variable resistance and a controlled load. The first branch comprises, in series, a diode 32 having a cathode 34 and an anode 36, variable resistor 38, conductor 40, load 1 and conductor 42. The cathode 34 of diode 32 is connected to the positive terminal 14 of signal source 12 by conductor 29. The anode 36 of diode 32 is connected to variable resistor 38 which is in turn connected in series to load 1 through conductor 40. Load 1 is connected to point 26 of the voltage divider by conductor 42. The second branch comprises, in series, a diode 44 having an anode 46 and a cathode 48, variable resistor 50, conductor 52, load 2 and conductor 54. This second branch extends between positive conductor 29 and point 28 of the voltage divider and is similar to the first branch except that the anode 46 is connected to conductor 29 and the diode 44 is therefore polarized to conduct in a direction opposite to that of diode 32.

The function of the cross-over circuit illustrated in FIG. 1 may be best understood by reference to FIG. 2. For this purpose, let it be assumed that load 1 is a device which controls the armature voltage of an electric motor, and that an increase in voltage or current applied to load 1 will reduce the motor armature voltage from the full rated armature voltage. Load 1 could, for example, be a turn-off control winding of a magnetic amplifier. Let it further be assumed that load 2 is a device which controls the field voltage of the same motor and, similarly, that an increase in voltage or current to load 2 will result in a reduction of the field voltage below the full rated field voltage. Load 2, therefore, might also be a turn-off control winding of a magnetic amplifier.

Referring then to FIGS. 1 and 2, first assume that the signal voltage $V_s$ is at its lowest value and further that $V_s$ is less than $V_2$. Since $V_2$ is smaller than $V_1$, $V_s$ is, of course, smaller than $V_1$. Under these conditions it can be seen that conductor 29 is at a lower positive potential than either point 26 or point 28. No current will flow through the branch containing load 2 because diode 44 serves to block current flow from point 28 to conductor 29. Load 2 remains unenergized and the motor field voltage consequently remains at its full value. However, a current will flow through the other branch to load 1 since diode 32 is polarized to conduct in the direction from point 26 to conductor 29. Since $V_s$ is at its minimum value, the current flowing through load 1 will be at a maximum for any given branch resistance. The motor armature voltage will therefore be reduced a maximum amount for any given branch resistance. The amount of voltage reduction can be adjusted by varying the resistance 38 which controls the magnitude of current flow for a given potential drop across the branch. As signal voltage $V_s$ is increased, the motor field voltage remains at full value as long as $V_s$ is less than $V_1$ since diode 44 continues to block current which might flow through load 2. In the other branch, as signal voltage $V_s$ is increased, the potential drop between point 26 and conductor 29 is reduced which causes a reduction in current through load 1 and an increase in motor armature voltage. As an increasing signal voltage $V_s$ exceeds $V_2$, diode 44 becomes conductive and the energization of load 2 begins the reduction in motor field voltage. During cross-over, as long as $V_s$ is greater than $V_2$ but less than $V_1$, both diodes 32 and 44 are conductive and both the field voltage and armature voltage remain at partially reduced values as shown in the central portions of FIG. 2. Reduction of the field voltage before full armature voltage is applied results in a more nearly linear relationship between speed and signal voltage $V_s$ during cross-over since the changes in motor speed are relatively small during the initial stages of field weakening.

A further increase in $V_s$ causes diode 32 to block current flow through load 1 when $V_s$ exceeds $V_1$. At values of $V_s$ above this point the armature voltage is unaffected and remains at full rated value. As $V_s$ is increased above $V_1$ the current flowing through load 2 continues to increase which results in a further decrease in motor field voltage. Resistor 50 controls the rate of decrease by varying the current flow for any given potential drop across the branch.

Referring to FIG. 2, the general area in which the field voltage curve crosses the armature voltage curve may be called the cross-over area. The area to the left of the cross-over may be generally referred to as the armature control range and the area to the right of the cross-over may be referred to generally as the field weakening control range. It can be seen that in the armature control range an increase in signal voltage $V_s$ results in an increase in armature voltage while the field voltage remains substantially constant. In the field weakening range an increase in signal voltage $V_s$ results in a decrease in field voltage while the armature voltage remains substantially constant. In particular, it should be noted that a decrease in signal voltage $V_s$ from point A to point B results in a change in field voltage from point C to point D. At the same time, the armature voltage remains constant during the change from point E to point F on the armature voltage curve. The significance of these changes will be demonstrated later in connection with the operation of a motor control system.

FIG. 3 illustrates a motor montrol system which incorporates the previously described cross-over circuit. The controlled motor 55 has an armature 56 and field winding 58. The motor armature 56 is supplied with current by a controllable armature supply 60 having input terminals 62 and 64 connected to main power lines L1 and L2, output terminals 66 and 68, and a control means 70 here preferably shown as a control winding of the type used in a magnetic amplifier. The control winding 70 in the system illustrated is of the shut-off type in that an increase in current therethrough results in a decrease in output from the controlled armature supply 60. The armature supply may be of any of the types known to the art including magnetic amplifiers, electronic amplifiers and rotating systems.

The output of the armature supply 60 is carried by conductors leading from terminals 66 and 68 to armature 56. A dropping resistor 86 is placed in series with armature 56 to serve as a means of measuring the armature current. As is well known in the art, the voltage drop across such a current carrying resistor is proportional to the current drawn by the armature. The voltage signal picked up by conductors 88 and 90 may therefore be utilized as an indication of armature current. Any form of device which provides a signal proportional to the magnitude of armature current may be used in place of resistor 86.

The motor field 58 is energized by a controllable field supply 92, which may be of any of the types known in the art, including magnetic and electronic amplifiers. Field supply 92 is shown with output terminals 94 connected to field 58, input terminals 96 connected to main power lines L1 and L2, and a control winding 98 of the type used in magnetic amplifiers. The control winding 98 is of the shut-off type since it is preferably arranged to cause a decrease in output from the controlled field supply 92 when the current through control winding 98 is increased.

The electrical power requirements of the control circuit are furnished through power supply transformer 100 having a primary winding 102 connected to power lines L1 and L2 and two secondary windings 104 and 106. The alternating current from winding 106 is lead to the full wave bridge rectifier 108. The output of rectifier 108 is smoothed by the filtering network consisting of inductor 110 and capacitor 112. The filtered direct current is then carried by conductors 114 and 116 to the various control components.

In the upper right-hand portion of FIG. 3 there is, enclosed by a dashed line, a cross-over circuit 118 containing the elements of the basic cross-over circuit illustrated in FIG. 1 and heretofore discussed. The fixed reference D.C. voltage is obtained from conductors 114 and 116, and the variable D.C. signal voltage is obtained through conductors 120 and 122. Load 1 and load 2 of FIG. 1 are represented in the system of FIG. 3, respectively, by control winding 70 of the armature supply 60 and by control winding 98 of the field supply 92.

The variable D.C. signal which controls the cross-over circuit 118 is produced by mixing several independent signals in a signal mixing device such as magnetic amplifier 124. In the system illustrated in FIG. 3, there are two control windings 126 and 128 in magnetic amplifier 124. Control winding 126 carries a speed setting signal, and the current limit signal is fed to control winding 128. Alternating current is supplied to the magnetic amplifier 124 by winding 104 of power supply transformer 100. Conductor 130 leads to one input terminal of bridge rectifier 132, while conductor 134 connects with a point between windings 136 and 138. Diodes 140 and 142 are poled so that current is alternatively conducted through winding 136 during one half cycle and through winding 138 during the opposite half cycle. The controlled output of magnetic amplifier is then rectified by full wave bridge rectifier 132 and carried to the cross-over circuit by conductors 120 and 122.

The direct current speed signal for control winding 126 is furnished by speed setting potentiometer 144. Control winding 126 is of the turn-on type in that an increase in current therethrough results in an increased output from the magnetic amplifier 124. The fixed terminals of potentiometer are connected to the D.C. voltage carrying conductors 114 and 116. One fixed terminal and the slider 146 are connected to control winding 126. Movement of slider 146 therefore controls the current through control winding and consequently affects the output of magnetic amplifier 124. The output of magnetic amplifier in turn controls the speed of the motor. It can be seen that one advantage of this arrangement is that the speed setting rheostat 144 need carry only the current necessary to energize the control winding 126 which is a relatively small current. Power losses are therefore reduced and rheostat 144 may be of an inexpensive variety.

The current limit signal for control winding 128 is furnished by current limit circuit 148 which is of the spill-over type. The reference D.C. voltage from conductors 114 and 116 is impressed across resistor 150 and rheostat 152 in series. Rheostat 152 has a slider 154 and fixed terminals 156 and 158. It can be seen that this impressed voltage will cause terminal 158 to be positive relative to terminal 156. Consequently, slider 154 will also be positive in respect to terminal 156 and movement of slider 154 will vary the potential of slider 154 relative to terminal 156. The armature current signal is carried by conductors 88 and 90 and the polarity is arranged so that the more negative of conductors 88 and 90 is connected to terminal 156. The other conductor 90 is connected in series with variable resistance 160, control winding 128 and unidirectional diode 162. It can be seen that no current will flow through control winding 128 as long as the armature current signal voltage across resistor 86 is of lesser magnitude than the voltage between terminal 156 and slider 154 since the potential of slider 154 is then more positive than that of conductor 90 and diode 162 blocks the flow of current. As the armature current increases the potential of conductor 90 increases and when the positive potential of conductor 90 exceeds that of slider 154, current will flow through diode 162 and consequently winding 128. At this point control winding 128, a turn-off winding, develops ampere turns counteracting those developed by winding 126 and is effective to reducing the output of magnetic amplifier 124. The greater the armature current, the greater will be the control winding current and smaller will be the output of magnetic amplifier 124. Variable resistor 160 is effective to vary the current through winding 128 for a given difference in potential between slider 154 and conductor 90, and is therefore effective in controlling the degree of change of magnetic amplifier output. Movement of slider 154 of rheostat 152 selects the armature current at which initiation of current limit control is desired.

FIG. 4 illustrates an armature supply system of the well known Ward Leonard type which could be used as armature supply 60 of FIG. 3. In FIG. 4, a prime mover 164 drives the generator armature 166, the output of which is fed to output terminals 168, which are the equivalent of output terminals 66 and 68 of FIG. 3. The generator field 170 is supplied from the magnetic amplifier 172 which in turn is supplied from power lines L3 and L4 through terminals 174, which are the equivalent of terminals 62 and 64 of FIG. 3. Magnetic amplifier 172 is controlled by control winding 176 which is the equivalent of control winding 70 of FIG. 3.

The operation of the motor control system illustrated in FIG. 3 will now be described.

First assume that the rheostat 144 is set to provide a relatively low speed signal current to control winding 126. This results in a low output from magnetic amplifier 124 and a relatively low D.C. signal voltage $V_s$ at conductors 120 and 122 for the cross-over circuit 118, the operation of which has already been explained. A low variable D.C. signal voltage $V_s$ causes control winding 70 of armature supply 60 to be energized which in turn causes the motor armature voltage to be at a reduced value. At the same time control winding 98 is unenergized resulting in application of full field voltage. The motor is then running at low speed and can then be said to be operative in the armature control range, or with reference to FIG. 2, the motor is operating in that area where the signal voltage $V_s$ is less than $V_2$.

As the slider 146 of rheostat 144 is rotated in a clockwise direction the speed setting signal in control winding 126 is increased. The output of magnetic amplifier and the variable D.C. signal voltage $V_s$ are consequently increased. FIG. 2 illustrates the effect upon field and armature voltages as the signal voltage $V_s$ is varied. When the signal voltage $V_s$ has been increased to that point where it equals $V_2$ the motor field voltage begins to decrease. The motor armature voltage and motor speed increases with increased signal voltage $V_s$ until the point is reached where the signal voltage $V_s$ equals $V_1$. The motor is then under field weakening control. Further increase in the signal voltage $V_s$ does not affect the motor armature voltage but results in increased motor speed by causing the motor field voltage to be decreased.

The variable D.C. signal voltage $V_s$ will also be affected by energization of any control windings of magnetic amplifier 124 in addition to control winding 126. In the system illustrated in FIG. 3, there is shown one other control winding 128 which serves to carry a current limit signal when the current of motor armature 56 exceeds a desired value. As previously explained current limit circuit 146 energizes control winding 128 when the current through dropping resistor 86 exceeds a selected value. Control winding 128 is of the turn-off type, and consequently, an increased current limit signal to winding 128 results in a decreased variable D.C. signal voltage at the input of the cross-over circuit 118 at conductors 120 and 122. If it were desired that other types of control signals affect the armature and field voltages through cross-over circuit 118, such signals could be introduced through additional control windings on magnetic amplifier 124.

One of the advantages of the illustrated system is the type of control exerted in response to a current limit signal, particularly when the motor is operating in the weakened field range. Assume first that the motor is operating in the weakened field range and that the signal voltage is at a value represented by point A on the axis of abscissas of FIG. 2. Under these conditions, the motor field voltage is at a reduced value represented by point C on the field curve, and the motor armature voltage is at its full rated value at point E on the armature curve. Then assume that the motor load increases significantly. The increased load, of course, tends to slow the motor and increase the armature current. If the armature current increases to an undesirably high level and exceeds the value selected by movement of slider 154, the current limit circuit energizes control winding 128 to reduce signal voltage $V_s$. Assume that such a reduction in signal voltage $V_s$ is from point A of FIG. 2 to point B. Consequently the motor field voltage will increase from point C to point D and the motor armature voltage remains substantially constant during the transition from point E to point F. Since the torque available is proportional to the field strength, the increase in field voltage from point C to point D increases the torque available to overcome the increased motor load. If the increased load can be overcome by increasing the field strength, the armature current will not increase to dangerous levels and the armature voltage will not have to be reduced. The motor can therefore continue to operate while subjected to the increased load.

If the motor load is increased to such a level that field strengthening is insufficient to overcome the load, it is desirable to reduce the armature voltage to prevent an undesirably high armature current. This eventuality is also provided for in the system illustrated in FIG. 3. When the armature current reaches a sufficiently high value the current limit will energize control winding sufficiently to cause the variable D.C. signal voltage $V_s$ to be reduced below $V_1$ (FIGS. 1 and 2). At this point the control winding 70 of the armature supply 60 (FIG. 3) will be energized by the cross-over circuit 118 and the armature voltage will be reduced. Further reduction in signal voltage $V_s$ will result in further decrease in the armature voltage while the motor field voltage remains substantially constant.

It can be seen that the approach used in this design provides for flexibility in the operation of this type of circuit. In the system illustrated in FIG. 3 there are three separate components at which electrical control signals may be introduced. They are the armature supply 60, the field supply 92 and the magnetic amplifier 124. Signals affecting only the motor field current, such as a feedback signal to compensate for field heating, can be applied if desired to only the motor field supply through additional control windings similar to control winding 98. Signals affecting only the armature voltage, such as armature voltage feedback and IR compensation can be applied only to the armature supply through additional windings similar to winding 70. As has been explained, signals such as current limit which should be applied at the correct time to both the motor field and armature circuits can be introduced at the main speed control such as magnetic amplifier 124 in FIG. 3 where the effect is transmitted to the armature supply 60 and the field supply 92 through the cross-over circuit 118.

I claim:

1. In combination,
   (a) a direct current motor,
   (b) first means for normally supplying the motor armature with a predetermined maximum value of current which is decreased inversely in accordance with the value of a first control potential,
   (c) second means for normally supplying the motor field winding with a given maximum value of current which is decreased inversely in accordance with the value of a second control potential,
   (d) a first source of adjustable direct current potential,
   (e) a second source providing first and second constant direct current potentials of different magnitude,
   (f) third means in circuit with the motor armature and said first source and providing a resultant direct current potential which varies as a function of the magnitude of said adjustable direct current potential and the instantaneous value of motor armature current,
   (g) fourth means in circuit with said first, second and third means and said second source to subject said first means to a first control potential which varies in accordance with the algebraic resultant of said first constant direct current potential and said variable resultant direct current potential and to subject said second means to a second control potential which varies in accordance with the algebraic resultant of said second constant direct current potential and said variable resultant direct current potential.

2. The invention as defined in claim 1, wherein said fourth means comprises a magnetic amplifier with a first control winding energized by said first source of adjustable direct current potential and a second control winding energized by a voltage which varies as a function of the magnitude of the instantaneous value of motor armature current.

3. In a direct current motor control system:
   (a) an armature current supply having electroresponsive means for regulating the output thereof in a manner whereby the output is reduced in response to an increased armature signal voltage and increased in response to a reduced armature signal voltage;
   (b) a field current supply having electroresponsive means for regulating the output thereof in a manner whereby the output is reduced in response to an increased field signal voltage and increased in response to a reduced field signal voltage;
   (c) a source of direct current signal voltage comprising a signal mixing means;
   (d) a source of direct current reference voltage; and
   (e) a cross-over circuit comprising:
      (1) a voltage divider system connected across the terminals of said source of direct current reference voltage;
      (2) a resistance connected across the terminals of said source of direct current signal voltage;
      (3) a conductor connecting a first terminal of said source of direct current reference voltage to a first terminal of said source of direct current signal voltage;
      (4) means for supplying said field signal voltage to said field current supply comprising a first branch circuit connected between a second terminal of said source of direct current signal voltage and a first point on said voltage divider system, and said first branch circuit comprising, in series, a unidirectional conductive element, a resistance and said electroresponsive means to regulate the output of the field current supply; and
      (5) means for supplying said armature signal voltage to said armature current supply comprising a second branch circuit connected between said second terminal of said source of direct current signal voltage and a second point on said voltage divider system between said first point on said voltage divider system and the second terminal of said source of direct current reference voltage, and said second branch circuit comprising, in series, a unidirectional conductive element polarized to conduct in a direction relative to said second terminal of said source of signal voltage opposite from that of said unidirectional conductive element of said first branch circuit, a resistance and said electroresponsive means to regulate the output of the armature current supply.

4. The invention as defined in claim 3, wherein:
   (a) said signal mixing means comprises means responsive to an increase in armature current above a preselected value for limiting the armature current to safe levels.

5. The invention as defined in claim 3, wherein said signal mixing means comprises a magnetic amplifier with:
   (a) a control winding energized by a voltage which varies as a function of the magnitude of the instantaneous value of motor armature current above a preselected value; and
   (b) a control winding energized by a source of direct current of selectively variable voltage.

6. The invention as defined in claim 3, wherein:
   (a) said first and second branch circuits include a selectively variable resistance element.

References Cited by the Examiner

UNITED STATES PATENTS 3,007,099  10/61  Greening et al. _____ 318—338 X
3,054,937   9/62  Long _____ 318—338 X ORIS L. RADER, *Primary Examiner.*